(12) United States Patent
Fellinger

(10) Patent No.: US 7,475,830 B2
(45) Date of Patent: Jan. 13, 2009

(54) SPRAY-ON INSULATION SYSTEM WITH SMOOTH BORE HOSE AND METHOD

(75) Inventor: Thomas J. Fellinger, Littleton, CO (US)

(73) Assignee: Johns Manville, Denver, CO (US)

( * ) Notice: Subject to any disclaimer, the term of this patent is extended or adjusted under 35 U.S.C. 154(b) by 105 days.

(21) Appl. No.: 11/509,982

(22) Filed: Aug. 25, 2006

(65) Prior Publication Data

US 2007/0012809 A1 Jan. 18, 2007

Related U.S. Application Data

(63) Continuation of application No. PCT/US2005/008824, filed on Mar. 16, 2005.

(60) Provisional application No. 60/554,184, filed on Mar. 18, 2004.

(51) Int. Cl.
*A62C 5/02* (2006.01)

(52) U.S. Cl. .................. 239/8; 239/433; 239/588; 239/654; 52/742.13; 156/71; 138/120

(58) Field of Classification Search .................. 239/8, 239/9, 433, 650, 654, 419, 525, 587.1, 588; 406/47, 100, 154; 52/742.13; 156/71; 138/118, 138/120

See application file for complete search history.

(56) References Cited

U.S. PATENT DOCUMENTS

| | | |
|---|---|---|
| 2,664,375 A | 12/1953 | Philipps |
| 3,861,599 A * | 1/1975 | Waggoner .................. 239/654 |
| 3,995,775 A | 12/1976 | Birkmeier et al. |
| 4,134,242 A | 1/1979 | Musz et al. |
| 4,199,281 A | 4/1980 | Wolf |
| 4,203,155 A | 5/1980 | Garst |
| 4,272,935 A | 6/1981 | Lukas et al. |
| 4,487,365 A | 12/1984 | Sperber |
| 4,648,920 A | 3/1987 | Sperber |
| 4,673,594 A | 6/1987 | Smith |
| 4,710,480 A | 12/1987 | Buschmann et al. |
| 4,773,960 A | 9/1988 | Vincelli et al. |
| 4,804,695 A | 2/1989 | Horton |
| 4,923,121 A | 5/1990 | Boyer |
| 5,114,281 A | 5/1992 | Hartnett et al. |
| 5,131,590 A | 7/1992 | Sperber |
| 5,209,608 A | 5/1993 | Edwards |
| 5,269,463 A * | 12/1993 | Burks .................. 239/654 |
| 5,641,368 A | 6/1997 | Romes et al. |
| 5,666,780 A | 9/1997 | Romes et al. |
| 5,669,740 A | 9/1997 | Twonsend et al. |
| 5,921,055 A | 7/1999 | Romes et al. |
| 5,952,418 A | 9/1999 | Romes et al. |
| 6,012,263 A | 1/2000 | Church et al. |
| 6,024,304 A * | 2/2000 | Sawada .................. 239/654 |
| 6,262,164 B1 | 7/2001 | Church et al. |

* cited by examiner

*Primary Examiner*—Steven J Ganey
(74) *Attorney, Agent, or Firm*—Robert D. Touslee

(57) ABSTRACT

A system for transporting insulation particles suitable for use in a process for forming an insulation product is provided, comprising: a blowing machine for forming an insulation particle/air suspension, wherein the blowing machine comprises at least one opening, and a hose in communication with the at least one opening, for transporting the suspension to or from the blowing machine, wherein the internal diameter variation of at least a portion of the hose is less than about 0.20 inch.

22 Claims, 1 Drawing Sheet

SPRAY-ON INSULATION SYSTEM WITH SMOOTH BORE HOSE AND METHOD

CROSS-REFERENCE TO RELATED APPLICATION

This application is a continuation of International Application No. PCT/US2005/008824, filed Mar. 16, 2005, which in turn claims the benefit of priority of U.S. Provisional Application No. 60/554,184, filed Mar. 18, 2004, the entire contents of which are incorporated by reference herein.

BACKGROUND

A blown-in insulation product can be formed by blowing a loose-fill fibrous insulation at a surface on which the insulation product is to be formed. During use of a conventional system for forming a blown-in insulation product, a significant amount of the insulation material provided by such system typically does not adhere to the surface on which the insulation product is to be formed and/or the installed insulation material. This can result in the accumulation of uninstalled insulation material at the worksite during the installation process. In addition, the efficiency of the installation process, the consistency of the installed insulation product and/or the properties of the installed insulation product can be adversely affected by the failure of a significant amount of the insulation material to adhere to the surface and/or the installed insulation material.

SUMMARY

According to one aspect, a system for transporting insulation particles suitable for use in a process for forming an insulation product is provided, comprising:

a blowing machine for forming an insulation particle/air suspension, wherein the blowing machine comprises at least one opening, and a hose in communication with the at least one opening, for transporting the suspension to or from the blowing machine, wherein the internal diameter variation of at least a portion of the hose is less than about 0.20 inch.

According to another aspect, a system for transporting insulation particles suitable for use in a process for forming an insulation product is provided, comprising:

a blowing machine for forming an insulation particle/air suspension, wherein the blowing machine comprises at least one opening, and a hose in communication with the at least one opening, for transporting the suspension to or from the blowing machine, wherein the internal diameter variation of the hose is less than about 0.20 inch.

According to another aspect, a method of transporting insulation particles suitable for use in a process for forming an insulation product is provided, comprising transporting an insulation particle/air suspension formed by a blowing machine through a hose, wherein the internal diameter variation of at least a portion of the hose is less than about 0.20 inch.

According to another aspect, a method of transporting insulation particles suitable for use in a process for forming an insulation product is provided, comprising transporting an insulation particle/air suspension formed by a blowing machine through a hose, wherein the internal diameter variation of the hose is less than about 0.20 inch.

DETAILED DESCRIPTION

Figure 1:
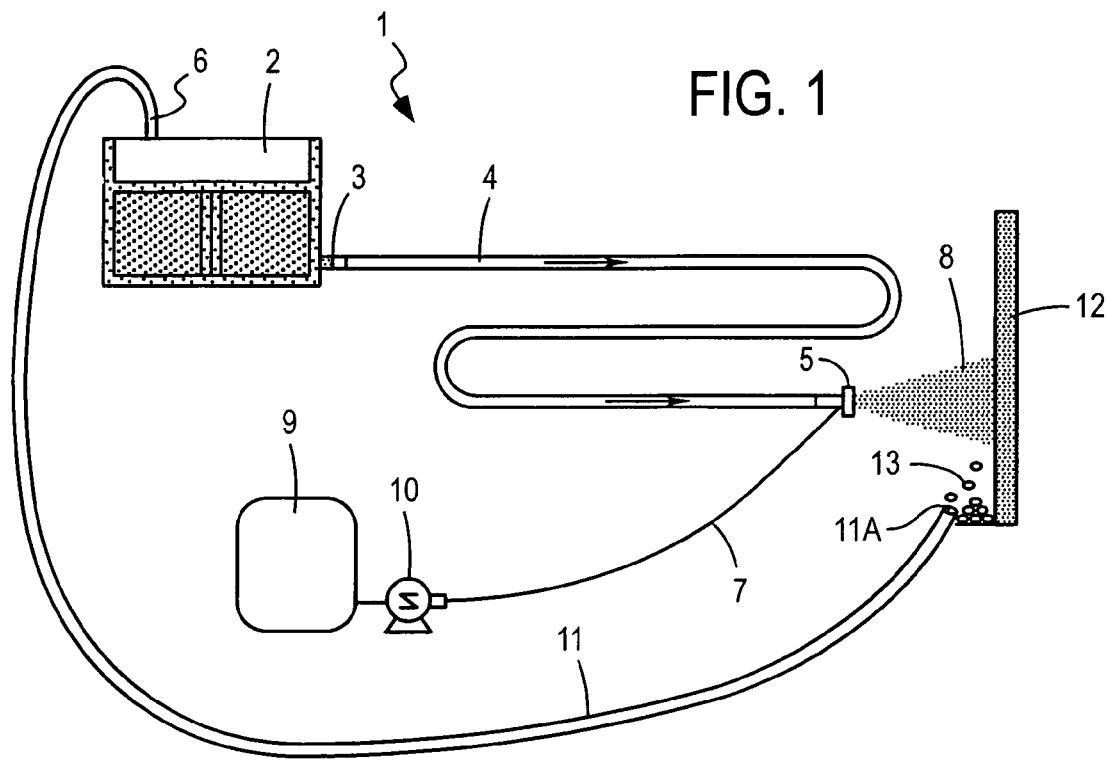
FIG. 1 is a schematic view of an exemplary system for transporting insulation particles.

The system and method can be used to transport insulation particles, particularly an insulation particle/air suspension. As used herein, the term "insulation particle/air suspension" refers to a suspension of insulation particles in air. The system and method can be used in connection with a process for forming an insulation product, for example, in a residential and/or commercial building structure. In an exemplary embodiment, the system and method can be used to transport insulation particles proximate to a surface to be insulated such as, for example, a surface of a wall, floor and/or attic cavity. For example, the insulation particles can be ejected from the system and directed at the surface to be insulated. Additionally or alternatively, the system and method can be used to recycle insulation material that has been directed at the surface to be insulated but has failed to adhere to such surface, and/or insulation material that has been intentionally removed from the installed product. For example, the recyclable material can include material that has collected on the floor adjacent to the surface to be insulated.

A blowing machine can be used to generate the insulation particle/air suspension. The blowing machine can include at least one opening, for example, an inlet and/or an outlet. By use of the inlet and/or outlet, an insulation particle/air suspension can be drawn into the blowing machine and/or ejected from the blowing machine, respectively. The blowing machine can be connected to receive insulation particles from a single source or multiple sources on a batch, semi-continuous or continuous basis. For example, the blowing machine can be connected to receive non-recycled insulation particles such as from a container or bag, and/or recycled insulation particles. The non-recycled and recycled insulation particles can be received by the same inlet or separate inlets of the blowing machine. The recycled insulation particles can have a higher density than insulation particles that have not been previously directed at the surface due to the coating thereof with water or an aqueous binder. The system and method can effectively transport such relatively high density recycled insulation particles from the application area to the blowing machine.

The blowing machine can have adjustable parameters, for example, to enable the adjustment of the flow rate of the insulation particle/air suspension. Any blowing machine that is suitable for blowing loose-fill insulation can be used. For example, a blowing machine which can be used is available from Unisul located in Winter Haven, Fla., under the trade name Volu-matic™ III.

The insulation particles can be formed from a material that is effective to provide, for example, thermal and/or acoustical insulation. The insulation particles can be formed from a material that is capable of being suspended in air by the blowing machine. The insulation particles can be formed from an inorganic fibrous material such as, for example, fiberglass, slag wool, mineral wool, rock wool, ceramic fibers, carbon fibers, composite fibers and mixtures thereof. Preferably, the insulation particles can be formed from at least fiberglass. Additionally or alternatively, the insulation particles can be formed from cellulose particles. The fibers from which the insulation particles can be formed can have any dimensions suitable for contributing to an insulation characteristic. For example, the average diameter of the fibers can be about 2 microns or less. The insulation particles can also contain various additives used to improve characteristics thereof and/or to assist in processing the particles.

The size and dimensions of the non-recycled and recyclable insulation particles are not particularly limited. For example, the size and dimensions of the insulation particles can enable the particles to be suitable for forming an insulation product, and capable of being suspended in air by the blowing machine. The insulation particles can have varying or substantially uniform sizes and dimensions. For example, the insulation particles can have an average diameter of one-half inch or less. The average diameter of insulation particles that have been recycled, for example, can be about one-quarter inch or less.

For example, the insulation particles can be in the form of fibrous nodules bound together with a binder. The fibrous nodules can have any shape such as a generally random shape, and can be generally spherical in shape having one or more radii. The fibrous nodules can be relatively small in size, and preferably the nodules can be smaller in size than relatively large-sized clumps of insulation material used in conventional systems. As a result of using relatively small-sized nodules, the nodules can be greater in number than the relatively large-sized clumps used in conventional systems. For example, the maximum dimension of the fibrous nodules can be about three-quarters (¾) inch, preferably about one-half (½) inch, more preferably about one-quarter (¼) inch. As used herein, the term "maximum dimension" of a nodule refers to the longest of the width, length, thickness or diameter of such nodule. The nodular fibrous insulation can also contain, in addition to the fibrous nodules, particles that are larger than such fibrous nodules.

The size of the nodules can depend on, for example, the thermal insulation performance desired, the desired R-value and density of the installed insulation, the size and shape of the volume to be insulated, and/or the relevant building code requirements. In an exemplary embodiment, the maximum dimension of a majority of the nodules, preferably at least about 70%, more preferably at least about 80%, and most preferably at least about 90%, can be about one-half inch. In a preferred embodiment, the maximum dimension of a majority of the nodules, preferably at least about 70%, more preferably at least about 80%, and most preferably at least about 90%, can be about one-quarter inch.

The dimensions of the nodules can be measured by any suitable technique such as, for example, using a plurality of stacked screen sieves containing various screen mesh sizes to segregate the nodules; spreading out a sampling of the nodules on a horizontal flat surface and physically measuring each nodule within the sample with a tape measure; using various air flow resistance methods to correlate nodule size with air flow resistance readings; and/or using sonic energy measurements through samples to correlate sound energy with nodule size.

The system and method can include at least one hose wherein the internal diameter variation of the hose or at least a portion of the hose is reduced, for example, to reduce flow resistance in the hose. The reduction of the flow resistance can in turn, for example, enable an increased velocity and/or mass flow rate of the insulation particles flowing through the hose. For example, the internal diameter variation of at least the portion of the hose can be less than about 0.20 inch, that is, from 0 to about 0.20 inch. Preferably, the internal diameter variation of at least the portion of the hose can be less than about 0.17 inch, more preferably less than about 0.14 inch, more preferably less than about 0.10 inch, and most preferably less than about 0.08 inch. In an exemplary embodiment, at least the portion of the hose can have an internal diameter variation of zero. The internal diameter variation of the portion of the hose is calculated as the difference between the largest internal diameter and the smallest internal diameter over the length of the portion of the hose.

The hose or a portion of the hose can have any suitable structure which enables minimization of the internal diameter variation of the hose or the portion of the hose. For example, the hose or a portion of the hose can be formed having a substantially smooth inner surface without any substantial inner surface variations formed by, for example, corrugations, ribs and/or helical structures. Alternatively, the hose or a portion of the hose can have a corrugated, ribbed and/or helical structure, wherein the internal diameter variation due to the corrugated, ribbed and/or spiraling structure is less than about 0.20 inch, preferably less than about 0.17 inch, more preferably less than about 0.14 inch, more preferably less than about 0.10 inch, and most preferably less than about 0.08 inch. For example, the hose or portion thereof can have protrusions on the inner surface thereof that protrude less than about 0.10 inch, preferably less than about 0.09 inch, more preferably less than about 0.07 inch, more preferably less than about 0.05 inch, and most preferably less than about 0.04 inch.

The portion of the hose having the internal diameter variation characteristic described above is a continuous section of the hose. Preferably, the portion of the hose is sufficiently long to reduce or minimize the flow resistance in the portion of the hose. The portion of the hose can constitute at any section of the hose, for example, the inlet or outlet section of the hose, or an intermediate section of the hose. Multiple portions of the hose can have the internal diameter variation characteristic described above.

For example, the length of the portion of the hose having the internal diameter variation characteristic described above can be at least about 25% of the total length of the hose, preferably at least about 50% of the total length of the hose, more preferably at least about 75% of the total length of the hose. In an exemplary embodiment, the entire length of the hose can have the internal diameter variation characteristic described above.

While not wishing to be bound by any particular theory, it is believed that the use of the hose in connection with the system and method can be effective to minimize flow resistance of an insulation particle/air suspension flowing through the hose. For example, employing the hose in connection with the system and method can result in about a 20% to 60% reduction of pressure loss, preferably about a 40% to 60% reduction, over a 100 foot length of hose, in comparison with a conventional corrugated hose not having the internal diameter variation characteristic described above. The minimization of the flow resistance, for example, can result in an increase in the velocity and/or mass flow rate of an insulation particle/air suspension flowing through the hose. The increased velocity and/or mass flow rate of the suspension flow can in turn, for example, improve adherence of the insulation particles to a surface and/or to other insulation particles, and/or reduce the amount of insulation particles which rebound from the surface. By reducing the occurrence of rebound and/or increasing the velocity and/or flow rate, the rate of installation of the blown-in insulation product can be increased and/or the consistency and/or properties of the installed insulation product can be improved. In addition, by transporting the insulation particles at an increased velocity and/or mass flow rate, the system and method can enable the efficient formation of an insulation product on a relatively smooth surface such as a sheathing board.

The at least one hose can have any dimensions suitable for conveying an insulation particle/air suspension. For example, the length of the at least one hose can depend on the particular application of the system and method, and can be from about 25 feet to about 300 feet, more preferably from about 50 feet to about 200 feet. The hose can have an average interior diameter of at least about 2 inches, preferably from about 3 inches to about 6 inches, more preferably from about 4 inches to about 5 inches. The hose can weigh less than about 1.5 lbs/ft, preferably less than about 1 lb/ft, and more preferably less than about 0.5 lb/ft. The at least one hose can be formed from any material suitable for conveying the insulation particle/air suspension. Preferably, the hose material can have a relatively smooth and/or slippery surface to minimize flow resistance through the hose. The at least one hose can be formed from any suitable flexible material that can facilitate arrangement of the hose on a worksite. For example, the at least one hose can be formed from rubber, synthetic rubber, elastomer-like polyurethane and/or Teflon™. Exemplary hoses which can be used are available from The Flexaust Company, Inc. located in Warsaw, Ind., under the trade name Flexadux™ R-2 or Flexadux™ R-7.

In an exemplary embodiment, at least a portion of the hose can be non-corrugated, and preferably substantially the entire hose can be non-corrugated. While not wishing to be bound to any particular theory, it is believed that the internal protrusions present in conventional corrugated hoses which do not possess the internal diameter variation characteristic described above, can generate substantial flow resistance which can cause a reduction in the velocity and/or mass flow rate of the insulation particles. In an exemplary aspect of the present system and method, use of the hose can, for example, enable an increase in the velocity and/or mass flow rate of the insulation particles transported therein. Such increased velocity and/or flow rate can result in a lower percentage of rebound, an improved consistency in the installed insulation product, and/or a higher productivity, i.e., an increased rate of installation of the insulation product.

The system can include at least one hose, and preferably at least two hoses, which is/are in communication with the at least one opening of the blowing machine. The at least one hose can be connected to transport the insulation particles to or from the blowing machine. In an exemplary embodiment, at least one hose can be connected in communication with an outlet of the blowing machine to transport the insulation particles proximate to the surface to be insulated. The hose can have a nozzle at an outlet end of the hose through which the flow of the suspension is ejected. One or more handles can be arranged at or near the nozzle to assist an operator in directing the flow of the insulation particles at the surface to be insulated.

Additionally or alternatively, at least one hose can be connected in communication with an inlet of the blowing machine to transport insulation particles for recycling to the blowing machine for further use. For example, one end of the recycle hose can be used to draw rebounded insulation particles into the hose, and the recycle hose can be used to transport the recycled particles to the blowing machine. In this embodiment, a vacuum source can be employed to enable the recyclable particles to be drawn into the hose.

One or more jet spray nozzles, and preferably two or more jet spray nozzles can be arranged for applying water or a liquid binder to the insulation particles. The water or liquid binder can promote adherence of the insulation particles to the surface to be insulated, as well as adherence between insulation particles. The water or liquid binder can be applied onto the insulation particles during ejection of the particles or after the particles are ejected from the nozzle. Preferably, the water or liquid binder can be applied onto the insulation particles before the array of particles becomes substantially dispersed. Use of such water or liquid binder can increase the adherence of the insulation particles to each other and/or the surface to be insulated, and can result in the formation of a more stable insulation product. The water or liquid binder can be provided from any suitable source such as, for example, an adjustable volume liquid pump. Exemplary methods, devices and materials in connection with the use of a nozzle for applying water or liquid binder to insulation particles are described in, for example, U.S. Pat. Nos. 5,641,368, 5,921,055 and 4,187,983.

Referring to FIG. 1, an exemplary system 1 for transporting insulation particles is shown. A blowing machine 2 can be connected to receive insulation particles. The blowing machine 2 suspends the insulation particles in air and blows the suspension from an outlet 3. A hose 4 having the inner diameter surface characteristic described above can be connected to receive the flow of the suspension from the outlet 3, and convey such flow proximate to the surface 12 to be insulated, such as a surface of a wall cavity. The insulation particles 8 can be ejected from the hose 4 and directed at the surface 12, via a nozzle 5 connected to the end of the hose 4. Water or aqueous binder can be stored in a tank 9 and can be supplied by a pump 10 through a pressure line 7, to at least one jet spray tip (not shown) arranged at the nozzle 5. The water or aqueous binder can be applied to the insulation particles 8 as the particles are ejected from the nozzle 5.

A recycle hose 11 having the inner diameter characteristic described above can be used to recycle recyclable material 13 which can include insulation particles and other material rebounded from the surface to be insulated and/or which are intentionally removed as excess with, for example, a scrubber (not shown). An end of the recycle hose 11 can be connected to transport the recyclable material 13 to an inlet 6 of the blowing machine 2. For example, an inlet 11A of the recycle hose 11 can be arranged where the recyclable material 13 is present, and such material 13 can be drawn into the recycle hose 11 and transported to the blowing machine 2. A vacuum source (not shown) can be used to provide suction power to the recycle hose 11.

Figure 2:
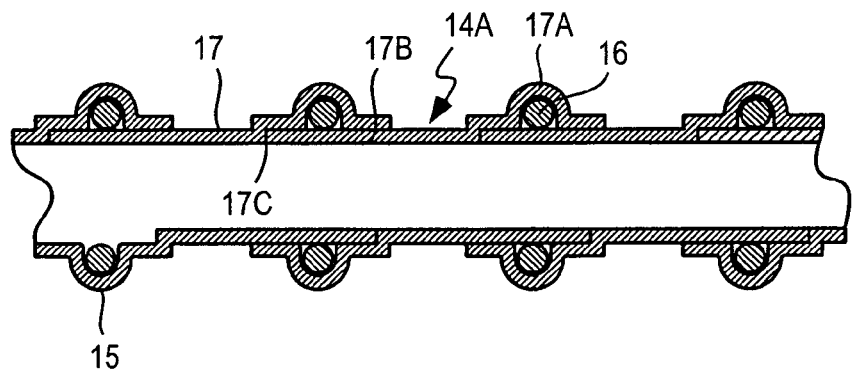
FIG. 2 is a partial cross-sectional view of an exemplary hose for transporting insulation particles.

Referring to FIG. 2, an exemplary hose 14A can include a supporting structure 16 such as reinforcing rings or a helical structure. The hose 14A can include a plurality of wall sections 17, wherein each wall section 17 includes an outer portion 17A and an inner portion 17B. The supporting structure 16 can be secured between the outer and inner portions 17A and 17B of adjacent wall sections 17. Each wall section 17 can have a recessed portion which accommodates the end of the inner portion 17A of an adjacent wall section 17, thereby forming a substantially smooth inner surface. Adjacent wall sections 17 can be attached to each other using any suitable means that do not detract from the interior surface characteristics of the hose 14A. For example, adjacent wall sections 17 can be attached to each other with rivets, adhesive, and/or by vulcanization and/or fusion processes.

Figure 3:
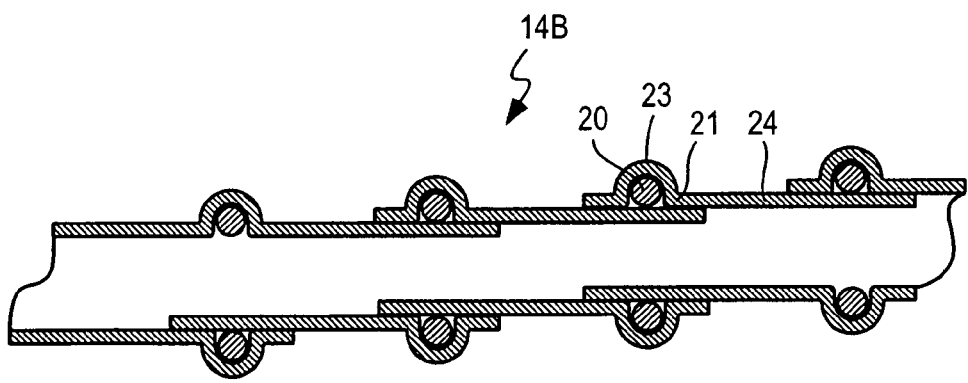
FIG. 3 is a partial cross-sectional view of another exemplary hose for transporting insulation particles.

Referring to FIG. 3, an exemplary hose 14B can include a supporting structure 20 such as reinforcing rings or a helical structure. The hose 14B can include a plurality of wall sections 21, wherein each wall section 21 includes a covering portion 23 and a straight portion 24. The supporting structure 20 can be secured between a covering portion 23 and a straight portion 24 of adjacent wall sections 21. In this embodiment, each wall section 21 does not have a recessed portion as in the exemplary hose shown in FIG. 2. Adjacent wall sections 21 can be attached to each other using any of the means discussed above with respect to the hose shown in FIG. 2.

While a detailed description of specific exemplary embodiments has been provided, it will be apparent to one of ordinary skill in the art that various changes and modification can be made, and equivalents employed without departing from the scope of the claims.

The invention claimed is:

1. A system for transporting insulation particles suitable for use in a process for forming an insulation product, comprising:
   a blowing machine for forming an insulation particle/air suspension, wherein the blowing machine comprises at least one opening, and
   a flexible hose, in communication with the at least one opening, for transporting the suspension from the blowing machine to proximate the surface to be insulated, wherein the internal diameter variation of at least a portion of the flexible hose amounting to at least about 25% of the length of the flexible hose is less than about 0.20 inch to increase the velocity of the suspension as the suspension exits the flexible hose, the flexible hose comprising a plurality of wall sections joined together, an exterior of the flexible hose comprising a supporting structure of one or more of spaced apart reinforcing rings or helical structure that project outwardly from other exterior portions of the flexible hose.

2. The system of claim 1, wherein the internal diameter variation of at least the portion of the flexible hose is less than about 0.17 inch.

3. The system of claim 1, wherein the internal diameter variation of at least the portion of the flexible hose is less than about 0.14 inch.

4. The system of claim 1, wherein the internal diameter variation of at least the portion of the flexible hose is less than about 0.10 inch.

5. The system of claim 1, wherein the internal diameter variation of at least the portion of the flexible hose is less than about 0.08 inch.

6. The system of claim 1. wherein the insulation particles are fibrous nodules.

7. The system of claim 1, wherein the length of the portion of the flexible hose is at least about 50% of the total length of the hose.

8. The system of claim 1, wherein the length of the portion of the flexible hose is at least about 75% of the total length of the hose.

9. The system of claim 1, wherein a second flexible hose is connected to the blowing machine to transport recyclable material to the blowing machine.

10. A system for transporting insulation particles suitable for use in a process for forming an insulation product, comprising:
    a blowing machine for forming an insulation particle/air suspension, wherein the blowing machine comprises at least one opening, and
    a flexible hose in communication with the at least one opening, for transporting the suspension from the blowing machine to proximate the surface to be insulated, wherein the internal diameter variation of at least about 25% of the length of the flexible hose is less than about 0.20 inch to increase the velocity of the suspension as the suspension exits the flexible hose, the flexible hose comprising a plurality of wall sections joined together, an exterior of the flexible hose comprising a supporting structure of one or more of spaced apart reinforcing rings or helical structure that project outwardly for other exterior portions of the flexible hose.

11. The system of claim 10. wherein a second flexible hose is connected to the blowing machine to transport recyclable material to the blowing machine.

12. A method at transporting insulation particles suitable for use in a process for forming an insulation product, comprising transporting an insulation particle/air suspension formed by a blowing machine through a flexible hose, wherein the internal diameter variation of at least a portion of the flexible hose amounting to at least about 25% of the length of the flexible hose is less than about 0.20inch to increase the velocity of the suspension as the suspension exits the flexible hose, the flexible hose comprising a plurality of wall sections joined together, an exterior of the flexible hose comprising a supporting structure of one or more of spaced apart reinforcing rings or helical structure that project outwardly or other exterior portions of the flexible hose.

13. The method of claim 12, wherein the internal diameter variation of at least the portion of the flexible hose is less than about 0.17 inch.

14. The method of claim 12, wherein the internal diameter variation of at least the portion of the flexible hose is less than about 0.14 inch.

15. The method of claim 12, wherein the internal diameter variation of at least the portion of the flexible hose is less than about 0.10 inch.

16. The method of claim 12, wherein the internal diameter variation of at least the portion of the flexible hose is less than about 0.08 inch.

17. The method of claim 12, wherein the insulation particles are fibrous nodules.

18. The method of claim 12, wherein the length of the portion of the flexible hose is at least about 50% of the total length of the flexible hose.

19. The method of claim 12, wherein the length of the portion of the flexible hose is at least about 75% of the total length of the hose.

20. The method of claim 12, wherein a second flexible hose is connected to the blowing machine to transport recyclable material to the blowing machine.

21. A method of transporting insulation particles suitable for use in a process for forming an insulation product, comprising transporting an insulation particle/air suspension formed by a blowing machine through a flexible hose, wherein the internal diameter variation of the flexible hose is less than about 0.20 inch over at least about 25% of the length of the flexible hose, the flexible hose comprising a plurality of wall sections joined together, an exterior of the flexible hose comprising a supporting structure of one or more of spaced apart reinforcing rings or helical structure that project outwardly for other exterior portions of the flexible hose.

22. The method of claim 21, wherein a second flexible hose is connected to the blowing machine to transport recyclable material to the blowing machine.

* * * * *